United States Patent
Hodgkinson et al.

(10) Patent No.: US 12,288,885 B2
(45) Date of Patent: Apr. 29, 2025

(54) ELECTROCATALYST INK

(71) Applicant: Johnson Matthey Hydrogen Technologies Limited, London (GB)

(72) Inventors: Adam Hodgkinson, Swindon (GB); Alejandro Martinez Bonastre, Reading (GB)

(73) Assignee: JOHNSON MATTHEY HYDROGEN TECHNOLOGIES LIMITED, London (GB)

( * ) Notice: Subject to any disclaimer, the term of this patent is extended or adjusted under 35 U.S.C. 154(b) by 39 days.

(21) Appl. No.: 17/754,592

(22) PCT Filed: Dec. 11, 2020

(86) PCT No.: PCT/GB2020/053174
§ 371 (c)(1),
(2) Date: Apr. 6, 2022

(87) PCT Pub. No.: WO2021/116691
PCT Pub. Date: Jun. 17, 2021

(65) Prior Publication Data
US 2024/0105964 A1  Mar. 28, 2024

(30) Foreign Application Priority Data

Dec. 12, 2019 (GB) ..................................... 1918275
May 19, 2020 (GB) ..................................... 2007384

(51) Int. Cl.
| | | |
|---|---|---|
| H01M 4/88 | (2006.01) | |
| H01M 4/86 | (2006.01) | |
| H01M 4/92 | (2006.01) | |
| H01M 8/10 | (2016.01) | |
| H01M 8/1004 | (2016.01) | |

(52) U.S. Cl.
CPC ....... *H01M 4/8828* (2013.01); *H01M 4/8605* (2013.01); *H01M 4/921* (2013.01); *H01M 8/1004* (2013.01); *H01M 2008/1095* (2013.01)

(58) Field of Classification Search
CPC .. H01M 4/921; H01M 4/8605; H01M 4/8828; H01M 8/1004
See application file for complete search history.

(56) References Cited

U.S. PATENT DOCUMENTS

| | | |
|---|---|---|
| 7,807,063 B2 | 10/2010 | Liu et al. |
| 7,867,669 B2 | 1/2011 | Liu et al. |
| 11,539,054 B2 | 12/2022 | Son et al. |
| 2009/0041941 A1 | 2/2009 | Sung et al. |
| 2010/0183943 A1 | 7/2010 | Ugawa et al. |
| 2013/0245219 A1 | 9/2013 | Perry et al. |
| 2013/0252134 A1 | 9/2013 | Takami et al. |
| 2013/0253157 A1 | 9/2013 | Takami et al. |
| 2019/0245233 A1 | 8/2019 | Pintauro et al. |

FOREIGN PATENT DOCUMENTS

| | | |
|---|---|---|
| CN | 101783409 A | 7/2010 |
| CN | 103749011 A | 4/2014 |
| EP | 1748509 A1 | 1/2007 |
| GB | 2015/050864 A1 | 10/2015 |
| JP | 2016-58396 A | 4/2016 |
| KR | 20090052340 A | 5/2009 |
| KR | 101102546 B1 | 1/2012 |
| WO | 2012/080726 A1 | 6/2012 |
| WO | 2013/015894 A2 | 1/2013 |
| WO | 2013/045894 A1 | 4/2013 |
| WO | 2014/184546 A1 | 11/2014 |
| WO | 2017/129982 A1 | 8/2017 |

OTHER PUBLICATIONS

Jung Won Suk, et al., "Improved durability of Pt catalyst supported on N-doped mesoporous graphitized carbon for oxygen reduction reaction in polymer electrolyte membrane fuel cells", Carbon, Elsevier Oxford, GB, vol. 122, Jul. 11, 2017 (Jul. 11, 2017), pp. 746-755, XP085153020, ISSN: 0008-6223, DOI:10.1016/J.CARBON. 2017.07.028 p. 746, paragraph 1. Introduction—p. 747p. 747p. 747, paragraphs 2.1., 2.3.

Zhao J., et al., "Preleached Pd—Pt—Ni and binary Pd—Pt electrocatalysts for oxygen reduction reaction in proton exchange membrane fuel cells", Applied Catalysis B: Environmental, Elsevier, Amsterdam, NL, vol. 101, No. 3-4, Jan. 14, 2011 (Jan. 14, 2011), pp. 660-668, XP027568082, ISSN: 0926-3373; abstract, paragraphs [001.], [3.4.3.], [004.].

*Primary Examiner* — Sarah A. Slifka
(74) *Attorney, Agent, or Firm* — BakerHostetler (57) ABSTRACT

The present invention provides a method of preparing an electrocatalyst ink, the method comprising a step of contacting a dispersion with a base metal-binding agent.

20 Claims, 2 Drawing Sheets

ELECTROCATALYST INK

FIELD OF THE INVENTION

The present invention provides a method of preparing an electrocatalyst ink. The electrocatalyst ink is used to prepare electrocatalyst layers in high performing membrane electrode assemblies.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the ion-conducting membrane is proton conducting, and protons, produced at the anode, are transported across the ion-conducting membrane to the cathode, where they combine with oxygen to form water.

A principal component of the PEMFC is the membrane electrode assembly, which is essentially composed of five layers. The central layer is the polymer ion-conducting membrane. On either face of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The electrocatalyst layers also generally comprise a proton conducting material, such as a proton conducting polymer, to aid transfer of protons from the anode electrocatalyst to the ion-conducting membrane and/or from the ion-conducting membrane to the cathode electrocatalyst.

Conventionally, the membrane electrode assembly can be constructed by a number of methods. Typically, the methods involve the application of one or both of the electrocatalyst layers to an ion-conducting membrane to form a catalyst coated ion-conducting membrane. Subsequently, a gas diffusion layer is applied to the electrocatalyst layer. Alternatively, an electrocatalyst layer is applied to a gas diffusion layer to form a gas diffusion electrode, which is then combined with the ion-conducting membrane. A membrane electrode assembly can be prepared by a combination of these methods e.g. one electrocatalyst layer is applied to the ion-conducting membrane to form a catalyst coated ion-conducting membrane, and the other electrocatalyst layer is applied as a gas diffusion electrode. The electrocatalyst layers are applied using an electrocatalyst ink which conventionally comprises an electrocatalyst material, an ion-conducting polymer, solvents and/or diluents, and any agents desired to be included in the electrocatalyst layer.

The electrocatalyst layers generally comprise an electrocatalyst material comprising a metal or metal alloy suitable for the fuel oxidation or oxygen reduction reaction, depending on whether the layer is to be used at the anode or cathode. Electrocatalysts for fuel oxidation and oxygen reduction are typically based on platinum or platinum alloyed with one or more other metals. The platinum or platinum alloy electrocatalyst can be in the form of unsupported nanometre sized particles (for example metal blacks) or can be deposited as discrete very high surface area nanoparticles onto a support material (a supported electrocatalyst). Electrocatalysts can also be in the form of coatings or extended films deposited onto a support material.

A wide range of electrocatalyst concepts, such as platinum binary alloys, platinum, monolayer electrocatalyst, platinum skin electrocatalyst, and nanostructured thin-film (NSTF) electrocatalysts have been investigated. Another approach to high activity electrocatalyst reported is that of the de-alloying Pt-M concept—materials obtained by the synthesis of base-metal (M) rich particles which are subjected to a selective leaching process of the less noble-metal from the particle surface. The resulting platinum-rich shells of the de-alloyed electrocatalyst particles exhibit compressive strain which, via electronic effects, leads to a highly active oxygen reduction reaction (ORR) catalyst.

SUMMARY OF THE INVENTION

The present inventors realised that the performance of membrane electrode assemblies can be improved by removing base metal contaminants which enter the electrocatalyst layer during preparation of the membrane electrode assembly. For example, base metal species can leach from alloys of platinum group metals with base metals during preparation of electrocatalyst inks due to break up of agglomerates in the presence of acidic ion-conducting polymers. This can lead to lower than expected electrochemical performance of a membrane electrode assembly. Contaminating base metal species can also be present in electrocatalyst layers which do not comprise alloy electrocatalysts. The contaminants may arise from, for example, the manufacturing process used to make the electrocatalyst, or in the manufacture of the ion conducting polymer. Therefore, a need to improve the performance of membrane electrode assemblies contaminated with base metal species was identified.

Accordingly, in a first aspect the present invention provides a method of preparing an electrocatalyst ink, the method comprising the steps of:
  i) preparing a dispersion comprising an electrocatalyst material, an ion-conducting material and a diluent; then
  ii) contacting the dispersion with a base metal-binding agent.

An electrocatalyst ink is a dispersion comprising an electrocatalyst material, an ion-conducting material and a diluent which, when dried, forms an electrocatalyst layer, preferably an electrocatalyst layer in a fuel cell membrane electrode assembly.

The inventors surprisingly found that membrane electrode assemblies containing electrocatalyst layers prepared using inks made by this method may exhibit improved electrochemical performance compared to membrane electrode assemblies containing electrocatalyst layers prepared by methods which do not include step ii).

In a second aspect, the present invention provides a dispersion comprising an electrocatalyst material, an ion-conducting material, a base metal-binding agent and a diluent. Such a dispersion is prepared as part of the method of the first aspect of the invention.

In a third aspect, the present invention provides a method of applying an electrocatalyst layer to a substrate, the method comprising the steps of:
i) preparing an electrocatalyst ink by the method of the first aspect of the invention; then
ii) applying the electrocatalyst ink onto said substrate and drying the ink to form an electrocatalyst layer. In a fourth aspect, the present invention provides an electrocatalyst layer obtainable by this method.

In a fifth aspect, the present invention provides a method of preparing a gas diffusion electrode, the method comprising applying an electrocatalyst layer to a substrate according to the method of the third aspect of the invention, wherein said substrate is a gas diffusion layer. In a sixth aspect, the present invention provides a gas diffusion electrode obtainable by this method.

In a seventh aspect, the present invention provides a method of preparing a catalysed decal transfer substrate, the method comprising applying an electrocatalyst layer to a substrate according to the method of the third aspect of the invention, wherein the substrate is a face of a decal transfer substrate. In an eight aspect, the present invention provides a catalysed decal transfer substrate obtainable by this method.

In a ninth aspect, the present invention provides a method of preparing a catalyst coated ion-conducting membrane, the method comprising applying an electrocatalyst layer to a substrate according to the method of the third aspect of the invention, wherein said substrate is a face of an ion-conducting membrane. In a tenth aspect, the present invention provides a method of preparing a catalyst coated ion-conducting membrane, the method comprising applying an electrocatalyst layer to an ion-conducting membrane by decal transfer from a catalysed decal transfer substrate prepared according to the method of the seventh aspect of the invention. In an eleventh aspect, the present invention provides catalyst coated ion-conducting membranes obtainable by these methods.

In a twelfth aspect, the present invention provides a method of preparing a membrane electrode assembly, the method comprising the steps of;
i) preparing a gas diffusion electrode according to the method of the fifth aspect of the invention;
ii) applying the gas diffusion electrode prepared in step i) to a face of an ion-conducting membrane. In a thirteenth aspect, the present invention provides a membrane electrode assembly obtainable by this method.

In a fourteenth aspect, the present invention provides a method of preparing a membrane electrode assembly, the method comprising the steps of;
i) preparing a catalyst coated ion-conducting membrane according to the methods of the ninth or tenth aspects of the invention;
ii) applying a gas diffusion layer to the electrocatalyst layer. In a fifteenth aspect, the present invention provides a membrane electrode assembly obtainable by this method.

In a sixteenth aspect, the present invention provides a fuel cell comprising a membrane electrode assembly according to the invention. Preferably, the fuel cell is a proton exchange membrane fuel cell.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

When an entity is referred to as being "of the invention", a non-limiting example being "an electrocatalyst layer of the invention", this means that the entity is either prepared by the corresponding method of the invention, or is obtainable by the corresponding method of the invention. So an electrocatalyst layer of the invention, for example, is an electrocatalyst layer prepared by the method of the third aspect of the invention, or is an electrocatalyst layer obtainable by the method of the third aspect of the invention (i.e. the fourth aspect of the invention).

The electrocatalyst material comprises an electrocatalyst which is preferably a platinum group metal or an alloy of a platinum group metal with a base metal, preferably an alloy of a platinum group metal with a base metal. Platinum group metals include platinum, palladium, rhodium, ruthenium, iridium and osmium. The preferred platinum group metals, in both the platinum group metal and alloy electrocatalysts, are platinum, palladium and rhodium, most preferable is platinum. A base metal is tin or a transition metal which is not a noble metal. A noble metal is a platinum group metal (platinum, palladium, rhodium, ruthenium, iridium or osmium) or gold. Suitable base metals in the alloy electrocatalyst are copper, cobalt, nickel, zinc, iron, titanium, molybdenum, vanadium, manganese, niobium, tantalum, chromium and tin. Preferred base metals in the alloy electrocatalyst include nickel, copper, cobalt, and chromium. More preferred base metals are nickel, cobalt and copper. The most preferred base metal is nickel. The ratio of platinum group metal to base metal in the alloy electrocatalyst is typically in the range of and including 3:1 to 1:3. The alloy electrocatalyst may be a de-alloyed electrocatalyst. Put another way, the atomic composition relative to platinum group metal of base metal at the surface of the electrocatalyst is lower than the atomic composition relative to platinum group metal of base metal in the bulk of the electrocatalyst, wherein the bulk is the total composition of the electrocatalyst. For example, the atomic composition relative to platinum group metal of base metal at the surface of the electrocatalyst may be in the range of and including 20 to 99%, 20 to 70% or 30 to 55% of the atomic composition relative to platinum group metal of base metal in the bulk of the electrocatalyst. The electrocatalyst may be an anode or a cathode electrocatalyst and is preferably a proton exchange membrane fuel cell electrocatalyst. Accordingly, the electrocatalyst may be a hydrogen oxidation reaction (anode) or oxygen reduction reaction (cathode) electrocatalyst.

The electrocatalyst may be supported or unsupported. Accordingly, the electrocatalyst may be supported on a support material. Put another way, the electrocatalyst material may consist of (or comprise only) an electrocatalyst supported on a support material. The term "supported" will be readily understood by a skilled person. For example, it will be understood that the term "supported" includes the electrocatalyst being dispersed on the support material and bound or fixed to the support material by physical or chemical bonds. For instance, the electrocatalyst may be bound or fixed to the support material by way of ionic or covalent bonds, or non-specific interactions such as van der Waals forces.

The support material may be carbon support material, e.g. a carbon powder, which may be, for example, a commercially available carbon black (such as from Cabot Corp. (Vulcan® XC72R) or Akzo Nobel (the Ketjen® black series)) or a graphitised version of these carbon blacks or other commercially available carbon blacks such as acetylene blacks (e.g. those available from Chevron Phillips (Shawinigan Black®) or Denka). The support material may also be one specifically designed for use in a fuel cell, such as those described in WO2013/045894.

Alternatively, the support material may be a metal oxide or a mixed oxide, in particular a conductive mixed oxide such as niobia-doped titania, phosphorus-doped tin oxide and mixed platinum group metal oxides or mixed metal oxides as disclosed in WO2012/080726), a carbide (e.g. tungsten carbide, molybdenum carbide or titanium carbide, suitably tungsten carbide or titanium carbide), a nitride, in particular a conductive nitride (e.g. titanium nitride or titanium aluminium nitride).

When the electrocatalyst is supported on a support material, the electrocatalyst loading may be expressed in terms of weight percent active metal, for example weight percent platinum group metal, which can be determined using inductively coupled plasma mass spectrometry (ICPMS). The loading may suitably be at least 10 wt % platinum group metal, typically at least 20 wt % platinum group metal by total weight of the electrocatalyst and the support. The electrocatalyst loading may suitably be no more than 90 wt % platinum group metal, typically no more than 60 wt % platinum group metal, for example no more than 50 wt % platinum group metal by total weight of the electrocatalyst and the support material.

The solid content of the electrocatalyst ink after contact with and, if necessary, removal of, the base metal-binding agent is not particularly limited and will depend on the printing method which will be used to prepare an electrocatalyst layer from the ink. Solid content includes the electrocatalyst material, the ion-conducting material, and any other solids present. For example, the solid content may be no more than 25 wt % and suitably at least 5 wt % by total weight of the electrocatalyst ink. In particular, an electrocatalyst ink used for screen printing may suitably contain in the range of and including 20 to 25 wt % solids, an electrocatalyst ink used in slot die printing may suitably contain in the range of and including 10 to 15 wt % solids, and an electrocatalyst ink used in gravure printing may suitably contain no more than 10 wt % solids.

The ion-conducting material is, suitably, a proton conducting ionomer. A skilled person understands that an ionomer is a polymer composed of both electrically neutral repeating units and ionizable repeating units covalently bonded to the polymer backbone via side-chains. The ion-conducting material may include ionomers such as perfluorosulphonic acid (e.g. Nafion® (Chemours Company), Aciplex® (Asahi Kasei), Aquivion® (Solvay Specialty Polymer), Flemion® (Asahi Glass Co.), or ionomers based on partially fluorinated or non-fluorinated hydrocarbon sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid which preferably has an EW in the range of and including 600 to 1200 wherein EW, or equivalent weight, is the number of grams of dry polymer per mole of sulfonic acid groups when the material is in the acid form. Particular perfluorosulfonic acid ionomers include the Nafion® range available from Chemours company, especially Nafion® 1100 EW and DE2020CS, the Aquivion® range available from Solvay, especially 830 EW.

The dispersion also comprises a diluent. Suitable diluents include organic solvents and water, preferably mixtures of one or more organic solvents with water. However, water alone may be used as a diluent. The amount of diluent is not particularly limited and will depend on the printing method which will be used to prepare an electrocatalyst layer from the ink. Accordingly, it will be adjusted for the desired solid content, which is discussed above. Suitable organic solvents are alcohol-based solvents, preferably propanols or ethanol, for example propan-1-ol. In mixtures of organic solvents and water, the weight percent of organic solvent by total weight of the diluent is suitably no more than 85 wt % and at least 10 wt %. When the mixture contains no more than 5 wt % organic solvent, for example no more than 1 wt %, and the rest is water, the dispersion may also include a mineral acid as described in WO 2006/233187. A specific example of a diluent is a mixture of propan-1-ol and water, e.g. a mixture of propan-1-ol and water containing about 80 wt % propan-1-ol. An alternative example of a diluent is a mixture of ethanol and water e.g. containing 10 to 50 wt %, suitably about 25 wt % ethanol. An alternative example of a diluent is a mixture of ethanol, propan-1-ol and water which may contain more propan-1-ol than ethanol e.g. 5 to 15 wt %, suitably about 10 wt % ethanol, and 50 to 70 wt %, suitably about 70 wt % propan-1-ol, the remainder being water.

Agglomerate particle break-up is preferably carried out before contact with the base metal-binding agent by methods known in the art such as high shear mixing, milling, ball milling, passing through a microfluidiser or a combination thereof. Agglomerates may comprise, for example when the electrocatalyst material is supported on a support material, loosely held individual support particles or aggregates held together by weak forces and can be readily broken down into the individual support particles or aggregates by such low energy agitation. Agglomerates of electrocatalyst may also be formed when the electrocatalyst is not supported, and such agglomerates can also be readily broken down.

The term "base metal-binding agent" means an agent which is capable of associating with a base metal species, preferably cations of base metals, such that the base metal species can be separated from the dispersion. Accordingly, the base metal-binding agent removes free (e.g. base metal not forming part of an electrocatalyst) base metal species from the dispersion. A base metal is tin or a transition metal which is not a noble metal. A noble metal is a platinum group metal (platinum, palladium, rhodium, ruthenium, iridium or osmium) or gold. Suitable base metals are iron, copper, cobalt, nickel, zinc, iron, titanium, molybdenum, vanadium, manganese, niobium, tantalum, chromium and tin. The amount of free base metal species in the dispersion prior to contacting with a base metal-binding agent is not particularly limited and may be, for example, no more than 3000 ppm, suitably no more than 2500 ppm. After the step of contacting the dispersion with a base-metal binding agent, the electrocatalyst ink produced typically contains no more than 2000 ppm base metal species, suitable no more than 1500 ppm. Accordingly, in this example, the base metal-binding agent is capable of removing about 1000 ppm, suitably about 500 ppm base metal species. The base metal-binding agent is capable of binding, i.e. capable of separating from the dispersion, base metal species including those of, for example, iron, nickel, copper, cobalt, and chromium, preferably cations, for example $Fe^{2+}$, $Fe^{3+}$, $Ni^{2+}$, $Cu^{2+}$, $Co^{2+}$, $Cr^{2+}$ and $Cr^{3+}$. In particular, it is capable of binding iron, nickel and/or cobalt species, preferably cations, for example $Fe^{2+}$, $Fe^{3+}$, $Ni^{2+}$, and $Co^{2+}$ preferably nickel and/or cobalt species, preferably cations, for example $Ni^{2+}$, and $Co^{2+}$. Whilst it is not a requirement of the present invention, the base metal species may arise from unintentional leaching of an alloy electrocatalyst or otherwise. For example, free nickel and cobalt species may arise from leaching of an electrocatalyst which is an alloy of a platinum group metal with nickel or cobalt during an agglomerate break-up step performed during preparation of the dispersion comprising an electrocatalyst material, an ion-conducting material and a diluent.

Suitable base metal-binding agents may be able to bind the base metals species up to an amount such that the wt % of base metal species by total weight of the bound base metal species and the base metal-binding agent is at least 1 wt %. The maximum amount of base metal species that the base metal-binding agent can bind is not particularly limited. For example, no more than 20 wt %, typically no more than 10 wt %, by total weight of the bound base metal species and the base metal-binding agent. Suitably, the base metal-binding agent does not bind platinum group metals and as such does not separate platinum group metals from the dispersion, for example, suitable base metal-binding agents bind less than 0.05 wt % platinum group metals, preferably less than 0.02 wt % platinum group metals, by total weight of the bound metal species and the base metal-binding agent.

The base metal-binding agent may be a base metal-chelating agent. Accordingly, the base metal-binding agent comprises a chelate ligand which chelates base metal species. Preferably, the base metal-chelating agent comprises a base metal-chelating nitrogen-containing moiety, suitably a base metal-chelating amino ligand. Accordingly, the base metal-chelating agent may comprise a multi-, preferably bi- or tridentate amino ligand comprising two or more, preferably two or three, base metal-chelating amino groups. The amino groups may be primary, secondary or tertiary amines and include pyridyl groups. Preferably, the base metal-chelating agent comprises a mixture of primary amine and pyridyl or secondary amine and pyridyl groups. One or more of the amino groups may be quaternized by an acid, such as sulfuric acid.

The base metal-chelating nitrogen-containing moiety may be a multidentate amino ligand have the following formula:

wherein n+p=3; n=1 to 3; x=1 to 5, preferably 1 to 3, more preferably 1 or 2, for example 1; the pyridyl group is substituted at position 2, 3 or 4, preferably position 2 or 3; the nitrogen atoms may be quaternized by an acid, such as sulfuric acid. Accordingly, base metal-chelating nitrogen-containing moieties include picolylamines, for example 2-picolylamine, 3-picolylamine or bis-2 or bis-3-picolyamine, all of which may be quaternized by an acid, such as sulfuric acid.

The base metal-chelating agent may comprise the base metal-chelating nitrogen-containing moiety immobilised on a solid support. In this aspect the base metal-chelating agent comprises, preferably consists of (or comprises only), the base metal-chelating nitrogen-containing moiety and a solid support material. Accordingly, the base metal-chelating agent may be a chelating ion-exchange resin. Suitably, the base metal-chelating agent is covalently attached to the solid support. The nature of the support is not particularly limited. It may preferably be a polymeric support. Preferably, the support is porous. Suitable polymeric supports include poly alkylene polymers, such as polyvinyl polymers. Particularly suitable poly vinyl polymers are polystyrenes. The term polystyrene in this sense is intended to include polymers and copolymers formed from styrene moieties including polystyrene itself as well as poly (alpha-methyl styrene), poly (chlorostyrene) and poly(chloromethylstyrene). Poly(vinyltoluene) may also be suitable. The polymer of the polymeric solid support may be cross-linked, for example using cross linkers such as divinyl aliphatic or aromatic compounds such as divinyl benzene. Suitably, the polymer may be a styrenyl divinylbenzene copolymer. Silica solid supports, including porous silica solid supports may also be suitable. The solid support is typically a particulate solid support, although this is not essential. The particle size is not particularly limited. Typical particle diameters are in the range of and including 450 µm to 600 µm. For example, the particles may have a d50 particle diameter of at least 50 µm, at least 100 µm, at least 200 µm or at least 300 µm. For example, the particles may have a d50 particle diameter of no more than 5 mm, no more than 2 mm, no more than 1 mm, no more than 900, or no more than 800 µm.

In a specific example, the base metal-chelating agent is a chelating ion-exchange resin comprising a multidentate base metal-chelating amino ligand, preferably quaternized using an acid, preferably sulfuric acid, which is immobilised on a polystyrene, preferably a styrenyl divinylbenzene copolymer, support. An exemplary multi-dentate amine ligand is a picolylamine such as 2-picolylamine, 3-picolylamine or bis-2 or bis-3-picolyamine. Specific ion-exchange resins include the Dowex® range by the Dow Chemical Company, such as Dowex® M4195.

Alternatively, the base metal-binding agent may be an acidic cation-exchange resin, for example an acidic cation-exchange resin comprising a sulphonic acid functional group, such as a sulphonated polystyrene cation-exchange resin. The term polystyrene in this sense is intended to include polymers and copolymers formed from styrene moieties, such as styrenyl divinyl benzene, which are known to a skilled person. A preferred cation-exchange resin of this type is a sulfonated styrenyl divinylbenzene copolymer such as, for example, an Amberlite® cation-exchange resin such as Amberlite® IR120 H.

The amount of base metal-binding agent used can be expressed in terms of the weight ratio of base metal-binding agent to electrocatalyst material. The amount used is not particularly limited, but it is advantageous that a relatively small amount with respect to the electrocatalyst material can be used. Suitably, the weight ratio of base metal-binding agent to electrocatalyst material is in the range of and including 1:20 to 1:1, preferably 1:20 to 1:3, more preferably 1:20 to 1:5.

The base metal-binding agent may be contacted with the dispersion by dispersing the base metal-binding agent in the dispersion. To remove the base metal-binding agent, the dispersion can be filtered. Preferably, although it is not necessary, the dispersion containing the base metal-binding agent is agitated. The manner in which the dispersion is agitated is not particularly limited, and a skilled person will be aware of suitable agitation methods, for example stirring or barrel rolling. A preferred method is barrel rolling. The dispersion is suitably agitated for no more than 72 hours, for example no more than 48 hours, preferably no more than 24 hours. The dispersion is suitably agitated for at least 1 h. Typically, the base metal-binding agent is removed at the time the electrocatalyst ink is required for forming an electrocatalyst layer e.g. the electrocatalyst ink is prepare and used instantly. However, this is not a requirement, and the base metal-binding agent can be removed at any time prior to forming an electrocatalyst layer, within the lifetime of the electrocatalyst ink. No heating is required which could damage the ink.

Alternatively, the base metal-binding agent may be contacted with the dispersion by passing the dispersion through a column packed with the base metal-binding agent. Preferably, no additional diluents are added when the dispersion is passed through such a column. The size of the column, the pressure used and the contact time between the dispersion and the base metal-binding agent are not particularly limited and a skilled person will be able to identify appropriate conditions based on, e.g., the mass, constituents, and solid content of the dispersion.

Alternatively, the base metal-binding agent may be contacted with the dispersion by placing a vessel containing the base metal-binding agent in the dispersion, wherein the vessel is permeable to the dispersion, but is not permeable to the base metal-binding agent. Accordingly, the base metal-binding agent will not become dispersed in the dispersion. Rather, the dispersion will enter through the permeable walls of the vessel and contact the base metal-binding agent whilst it remains in the vessel. Advantageously, no filtering step is required and the vessel containing the base metal-binding agent can simply be removed from the dispersion at the required time. The identity of the vessel is not particularly limited and may be, for example, a sealed mesh bag having apertures of the correct dimension to be permeable to the dispersion but not the base metal-binding agent. For example, the vessel may be prepared using a heat sealable polyethylene or polypropylene mesh. Whilst the vessel is in the dispersion, the dispersion may be agitated and a skilled person will be aware of suitable agitation methods, for example stirring or barrel rolling.

It is advantageous that the contact between the dispersion and the base metal-binding agent can be carried out at ambient temperature, e.g. in the range of and including 20 to 25° C., so no heating is required which could damage the ink. The pH of the dispersion during contact is dependent on the nature of the ionomer present and will preferably be about 2. It is advantageous that the benefits of the invention can be realised without having to alter the natural pH of the dispersion.

The electrocatalyst ink may comprise additional components, which are preferably added after contact with the base metal-binding agent. Such components include, but are not limited to: an oxygen evolution catalyst; a hydrogen peroxide decomposition catalyst; a hydrophobic agent (e.g. a polymer such as polytetrafluoroethylene (PTFE) or an inorganic solid with or without surface treatment) or a hydrophilic agent (e.g. a polymer of an inorganic solid, such as an oxide) to control reactant and water transport characteristics. The choice of additional components is within the capability of a skilled person to determine. Any additional solid components are included in the electrocatalyst ink solid contents recited herein.

The third aspect of the invention may also be considered as a method of preparing an electrocatalyst layer. In the third aspect of the invention, the electrocatalyst ink may be applied to a substrate by any suitable technique known to those in the art. Such techniques include, but are not limited to, gravure coating, slot die (slot, extrusion) coating, screen printing, rotary screen printing, inkjet printing, spraying, painting, bar coating, pad coating, gap coating techniques such as knife or doctor blade over roll, and metering rod application. The applied electrocatalyst ink is formed into an electrocatalyst layer by drying. The drying method is not particularly limited, and a skilled person will be able to identify a suitable method. For example, the electrocatalyst ink may be heated to a temperature in the range of and including 50 to 250° C.

The electrocatalyst layer of the invention may be a cathode or an anode, preferably of a proton exchange membrane fuel cell. The characteristics of the electrocatalyst layer, such as the thickness, electrocatalyst loading, porosity, pore size distribution, average pore size and hydrophobicity will depend on whether it is being used at the anode or cathode. In particular, the electrocatalyst layer is for use at the cathode. In an anode, the electrocatalyst layer thickness is suitably at least 1 µm, typically at least 5 µm. In an anode, the electrocatalyst layer thickness is suitably no more than 15 µm, typically no more than 10 µm. In a cathode, the electrocatalyst layer thickness is suitably at least 2 µm, typically at least 5 µm. In a cathode, the electrocatalyst layer thickness is suitably no more than 20 µm, typically no more than 15 µm.

The electrocatalyst loading in the electrocatalyst layer will also depend on the intended use. In this context, electrocatalyst loading means the amount of active metal, for example platinum group metal, in the electrocatalyst layer. So, when the electrocatalyst is an alloy of platinum, the electrocatalyst loading is the amount of platinum per unit area expressed as $mg/cm^2$. In a fuel cell cathode using a platinum electrocatalyst, the electrocatalyst loading is suitably at least 0.05 $mgPt/cm^2$, for example no more than 0.7 $mgPt/cm^2$, preferably no more than 0.3 $mgPt/cm^2$. In a fuel cell anode, the loading of platinum in the electrocatalyst layer is suitably at least 0.02 $mgPt/cm^2$, for example no more than 0.2 $mg/Ptcm^2$, preferably no more than 0.15 $mgPt/cm^2$.

In the fifth aspect of the invention, the electrocatalyst ink may be deposited onto a gas diffusion layer to form a gas diffusion electrode of the invention i.e. a gas diffusion layer combined with the electrocatalyst layer of the invention. The gas diffusion layer comprises a gas diffusion substrate and, preferably, a microporous layer. When a microporous layer is present, the electrocatalyst ink is deposited onto the microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. Typical microporous layers comprise a mixture of a carbon black and a polymer such as polytetrafluoroethylene (PTFE).

In the seventh aspect of the invention, the electrocatalyst ink may be applied to a decal transfer substrate to form a catalysed decal transfer substrate of the invention. A catalysed decal transfer substrate of the invention comprises a decal transfer substrate and an electrocatalyst layer of the invention. Additional layers may be deposited on the exposed face of the electrocatalyst layer prior to removal of the decal transfer substrate; for example, an ion-conducting ionomer layer may be applied from a dispersion of ionomer using any suitable deposition technique known as described above in relation to deposition of the electrocatalyst layer. Further additional layers can be added as required, for example as described in PCT Patent Application No. GB2015/050864. The decal transfer substrate is removed from the electrocatalyst layer at an appropriate time. The decal transfer substrate may be formed from any suitable material from which the electrocatalyst layer can be removed without damage. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

In the ninth aspect of the invention, electrocatalyst inks of the invention may be applied directly to one or both faces of an ion-conducting membrane to form a catalyst coated ion-conducting membrane of the invention. For example, one ink will contain a cathode electrocatalyst, and the other ink an anode electrocatalyst. If the electrocatalyst ink of the invention is only applied to one face of the ion-conducting membrane then an electrocatalyst layer can be applied to the other face by other, conventional, means. Alternatively, in the tenth aspect of the invention, a catalyst coated membrane of the invention may be prepared by transferring an electrocatalyst layer of the invention from a catalysed decal transfer substrate of the invention to one or both faces of an ion-conducting membrane. If an electrocatalyst layer of the invention is transferred to one face of the ion-conducting membrane, then an electrocatalyst layer can be applied to the other face by other, conventional means. An ion-conducting membrane of the invention may also be prepared by a mixture of the ninth and tenth aspects of the invention i.e. one electrocatalyst layer may be applied in accordance with the method of the ninth aspect of the invention, and the other electrocatalyst layer may be applied in accordance with the method of the tenth aspect of the invention.

The faces of the ion-conducting membrane referred to herein are separated by the thickness of the ion-conducting membrane. A skilled person will understand thickness to mean the measurement in the through-plane, z-direction. The opposing faces extend perpendicularly to the thickness i.e. in the x-y-plane. Preferably, the ion-conducting membrane is any membrane suitable for use in a proton exchange membrane fuel cell, for example the membrane may be based on a perfluorinated sulphonic acid material such as Nafion® (Chemours Company), Aquivion® (Solvay Specialty Polymers), Flemion® (Asahi Glass Group) and Aciplex® (Asahi Kasei Chemicals Corp.). Alternatively, the membrane may be based on a sulphonated hydrocarbon membrane such as those available from FuMA-Tech GmbH as the Fumapem® P, E or K series of products, JSR Corporation, Toyobo Corporation, and others.

The thickness of the ion-conducting membrane is not particularly limited and will depend on the intended application of the ion-conducting membrane. For example, typical fuel cell ion-conducting membranes have a thickness of at least 5 µm, suitably at least 8 µm, preferably at least 10 µm. Typical fuel cell ion-conducting membranes have a thickness of no more than 50 µm, suitably no more than 30 µm, preferably no more than 20 µm. Accordingly, typical fuel cell ion-conducting membranes have a thickness in the range of and including 5 to 50 µm, suitably 8 to 30 µm, preferably 10 to 20 µm.

The ion-conducting membrane may comprise additional components such as peroxide decomposition catalysts and/or radical decomposition catalysts, and/or recombination catalysts. Recombination catalysts catalyse the recombination of unreacted $H_2$ and $O_2$ which can diffuse into the ion-conducting membrane from the anode and cathode of a fuel cell respectively, to produce water. The ion-conducting membrane may also comprise a reinforcement material, such as a planar porous material (for example expanded polytetrafluoroethylene (ePTFE) as described in USRE37307), embedded within the thickness of the ion-conducting membrane, to provide for improved mechanical strength of the ion-conducting membrane, such as increased tear resistance and reduced dimensional change on hydration and dehydration, and thus further increase the durability of a membrane electrode assembly and lifetime of a fuel cell incorporating the catalysed ion-conducting membrane of the invention. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer.

Any reinforcement present may extend across the entire thickness of the ion-conducting membrane or may extend across only a part of the thickness of the ion-conducting membrane. It may further be advantageous to reinforce the perimeter of the first and second surface of the ion-conducting membrane to a greater extent than the central face of the first and second surface of the ion-conducting membrane. Conversely, it may be desirable to reinforce the centre of the first or second surface of the ion-conducting membrane to a greater extent than perimeter of the first or second surface of the ion-conducting membrane.

The process for preparing a membrane electrode assembly of the twelfth aspect of the invention may suitably be carried out as follows:
  (i) applying a gas diffusion electrode of the invention to each face of an ion-conducting membrane. Preferably, the layers are then laminated together;
  (ii) applying a gas diffusion electrode of the invention to one face of a catalyst coated ion-conducting membrane in which only one side comprises an electrocatalyst layer, and applying a gas diffusion layer to the electrocatalyst layer. The catalyst coated ion-conducting membrane may be a catalyst coated ion-conducting membrane of the invention comprising an electrocatalyst layer of the invention.

The process for preparing a membrane electrode assembly of the fourteenth aspect of the invention may suitably be carried out as follows:

(i) applying gas diffusion layers to both electrocatalyst layers of an ion-conducting membrane of the invention;
(ii) applying a gas diffusion electrode to one face of an ion-conducting membrane of the invention in which only one side comprises an electrocatalyst layer, and applying a gas diffusion layer to the electrocatalyst layer. The gas diffusion electrode may be a gas diffusion electrode of the invention.

Whilst the invention has being discussed mainly with reference to its use in the preparation of electrocatalyst inks for fuel cell electrocatalyst layers, a skilled person will understand that the method is applicable to the preparation of electrocatalyst inks for electrolyser electrocatalyst layers. Accordingly, the electrocatalyst layer of the invention may be an electrolyser electrocatalyst layer, preferably a proton exchange membrane electrolyser electrocatalyst layer. Also, in a seventeenth aspect, the present invention provides an electrolyser comprising a membrane electrode assembly of the invention. Preferably, the electrolyser is a proton exchange membrane electrolyser.

EXAMPLES

Electrocatalyst Ink Preparation

Five electrocatalyst inks were prepared, E1, E2, E3, E4 and C1.

E1 contained a de-alloyed 30 wtPt % $Pt_2Ni/C$ electrocatalyst and an 800 EW PFSA ionomer supplied by 3M under the name 3M 800 EW.

E2 contained a de-alloyed 30 wtPt % $Pt_2Ni/C$ electrocatalyst and a 700 EW PFSA ionomer supplied by Asahi Glass under the name IQ171.

E3 contained a de-alloyed 30 wtPt % $Pt_2Ni/C$ electrocatalyst and a 950 EW PFSA ionomer supplied by Chemours Company under the name DE2020CS.

E4 contained a 10 wtPt % PtNi 2/C electrocatalyst and an 800 EW PFSA ionomer supplied by 3M under the name 3M 800EW. The electrocatalyst was not subjected to a step of dealloying.

C1 contained a de-alloyed 30 wtPt % $Pt_2Ni/C$ electrocatalyst and an 800 EW PFSA ionomer supplied by 3M under the name 3M 800 EW.

As will be understood by a skilled person, dealloying removes a portion of nickel from the surface of the PtNi catalyst. The de-alloyed catalysts were prepared by a standard route involving first preparing a particulate carbon supported nanoparticle (Pt/C) material using a method analogous to the general method of preparation of carbon supported platinum catalysts described in WO2013/015894, using the carbon specifically designed for fuel cell applications disclosed in WO2013/015894. A solution of nickel nitrate in water was added in aliquots to dried Pt/C catalyst dispersed in $H_2O$ and mixed to ensure a homogeneous dispersion. Once deposition was complete the PtNi/C material was recovered, dried and annealed in a reducing atmosphere of 5% $H_2/N_2$ at 900° C. for one hour to alloy the platinum and nickel. The alloyed PtNi/C material was then washed in aqueous and subsequently alcoholic $H_2SO_4$ solution (20 ml g$^{-1}$ material) to leach out at least a portion of the nickel; both washing steps were carried out at 80° C. for 24 hours. This last step of washing in aqueous and subsequently alcoholic $H_2SO_4$ solution was not performed on the electrocatalyst in E4, hence it was not de-alloyed.

The electrocatalyst inks were prepared by mixing 16 g (E1), 15 g (E2) and (E3), or 20 g (E4) of electrocatalyst, 8.7 g (E1), 8.0 g (E2), 8.0 g (E3) and 9.4 g (E4) of ionomer, and solvent to form a dispersion such that the total amount of electrocatalyst ink was 205.9 g (E1), 191.7 g (E2), 191.7 g (E3) and 244.8 g (E4). The inks were prepared to contain about 12 wt % solids (electrocatalyst and ionomer). The dispersants used were 80 wt % 1-propanol in water (E1, E3, E4 and C1) or 10 wt % ethanol and 70 wt % 1-propanol in water (E2). The mixtures were bead milled together to form a well dispersed ink. Some material was lost during bead milling (a relatively high percentage due to the relatively small scale of the batches produced), such that the total amount of electrocatalyst inks produced was 150 g (E1), 116.7 g (E2), 127.3 g (E3) and 140.3 g (E4). The actual solid content of the inks after milling was 11.9 wt % (E1), 12.1 wt % (E2), 11.7 wt % (E3) and 11.8 wt % (E4).

Example 1—Base Metal-Binding Agent Capacity

Electrocatalyst inks E1, E2, E3 were placed into sealed containers and 3.67 g (E1), 2.85 g (E2) or 3.11 g (E3) of a base metal-binding agent Dowex® M4195 resin from the Dow Chemical Company was added. The weight ratio of base metal-binding agent to electrocatalyst material (after milling) was about 1:3 in each ink. The sealed containers were then barrel rolled for 48 hrs before the base metal-binding agent was removed by filtration. The resin was analysed for nickel content (wt % of total resin and nickel) by inductively coupled plasma mass spectrometry (ICPMS) and the results are provided in Table 1. It is evident that the base metal-binding agent removes nickel species from the electrocatalyst ink.

TABLE 1

| Ink | wt % Ni | wt % Pt |
| --- | --- | --- |
| E1 | 0.81 | <0.02 |
| E2 | 1.9 | <0.02 |
| E3 | 1.88 | <0.02 |

The electrocatalyst in ink E4 was not subjected to a dealloying step, meaning that there was a relatively large amount of free nickel species present in the ink after milling that would not be present in a de-alloyed electrocatalyst ink (e.g. E1, E2 and E3). Accordingly, this ink was used to determine the capacity of the base metal-binding agent. Electrocatalyst ink E4 was placed into a sealed container and a first portion of 4.57 g of base metal-binding agent Dowex® M4195 resin from the Dow Chemical Company was added. The weight ratio of base metal-binding agent to electrocatalyst material (after milling) was about 2:3. The sealed container was then barrel rolled for 1 h before the base metal-binding agent was removed by filtration. A second portion of 4.21 g of the same base metal-binding agent was then added and the container was resealed and barrel rolled for 24 h before being removed by filtration. A third portion of 3.87 g of the same base metal-binding agent was then added and the container was resealed and barrel rolled for 24 h before being removed by filtration. Finally, a fourth portion of 3.17 g of the same base metal-binding agent was added and the container was resealed and barrel rolled for 24 h before being removed by filtration.

Each portion of base metal-binding agent was analysed for nickel content (wt % of total base metal-binding agent and nickel) by ICPMS. The results are provided in Table 2.

TABLE 2

| Portion | wt % Ni | wt % Pt |
|---------|---------|---------|
| 1st | 0.71 | <0.02 |
| 2nd | 4.21 | <0.02 |
| 3rd | 4.32 | <0.02 |
| 4th | 4.11 | <0.02 |

It is evident that the base metal-binding agent reaches a capacity of about 4 wt % nickel species by total weight nickel and the base metal-binding agent after about a day of stirring with the ink. Moreover, platinum is not taken up by base metal-binding agent. In view of this capacity, it is evident that about a quarter to about a half of the base metal-binding agent used with inks E1, E2 and E3 is actually required to remove the free nickel species because the base metal-binding agent only removed about a quarter to a half of its full capacity.

Example 2—Electrochemical Activity

Preparation of Membrane Electrode Assemblies

Two catalyst coated ion-conducting membranes of 50 cm$^2$ active area were prepared by depositing anode and cathode catalyst layers onto a PTFE sheet and transferring the appropriate layers to either face of a PFSA reinforced membrane (15 μm thickness) at a temperature of between 150° C. to 200° C.

In one catalyst coated ion-conducting membrane, electrocatalyst ink E1 after 48 h barrel rolling with base metal-binding agent Dowex® M4195 from the Dow Chemical Company in a sealed container was used to prepare the cathode catalyst layer at a loading of 0.2 mgPt/cm$^2$. In the other catalyst coated ion-conducting membrane, electrocatalyst ink C1, which was not contacted with a base metal-binding agent, was used to prepare the cathode catalyst layer at a loading of 0.2 mgPt/cm$^2$. The anode catalyst layer in each catalyst coated ion-conducting membrane comprised an anode electrocatalyst (HiSPEC® 3000 with a nominal platinum loading of 20 wt % platinum on the carbon support) at a loading of 0.08 mgPt/cm$^2$.

A gas diffusion layer was applied to each face of each catalyst coated ion-conducting membrane to form the complete membrane electrode assembly. The gas diffusion layer used was a carbon fibre paper with a hydrophobic microporous layer containing carbon and PTFE (Sigracet® 22BB from SGL Technologies GmbH) applied to the face in contact with the catalyst coated ion-conducting membrane.

Membrane Electrode Assembly Performance Testing

The polarisation (current vs voltage) performance of each of the 50 cm$^2$ membrane electrode assemblies was measured in H$_2$/air at 80° C. under fully humidified and pressurised (100% RH, 100 kPag) conditions and under drier ambient pressure (50% as well as 26% RH and ambient pressure) conditions using H$_2$ and air flows both at a stoichiometries of 1.5 and 2.0 respectively. The cell humidity (RH) and pressure was controlled at the anode and cathode inlets for the test at 100 kPag, during the ambient pressure tests, the outlet was at ambient pressure.

Figure 1:
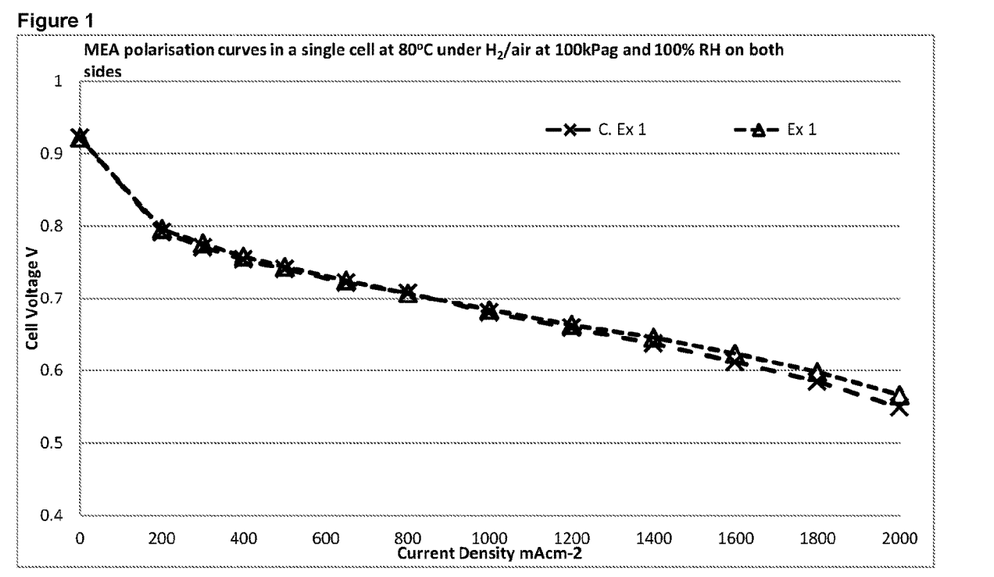
FIG. 1 is a plot showing voltage versus current density at 100% relative humidity for a membrane electrode assembly comprising a cathode electrocatalyst layer prepared using the method of the invention, and a comparative membrane electrode assembly.
Figure 2:
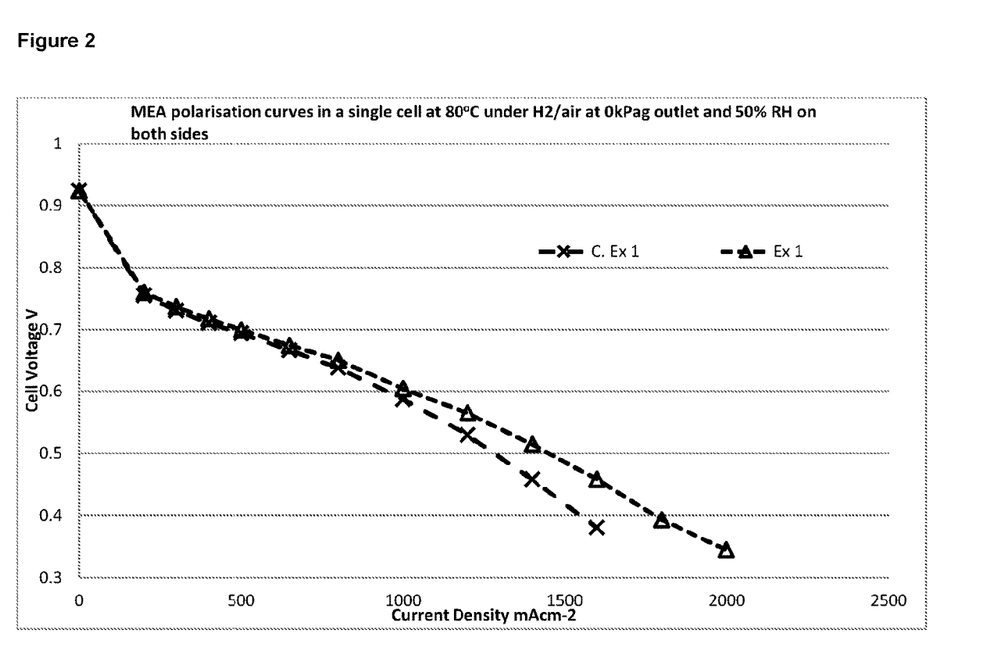
FIG. 2 is a plot of voltage versus current density at 50% relative humidity for a membrane electrode assembly comprising a cathode electrocatalyst layer prepared using the method of the invention, and a comparative membrane electrode assembly.
Figure 3:
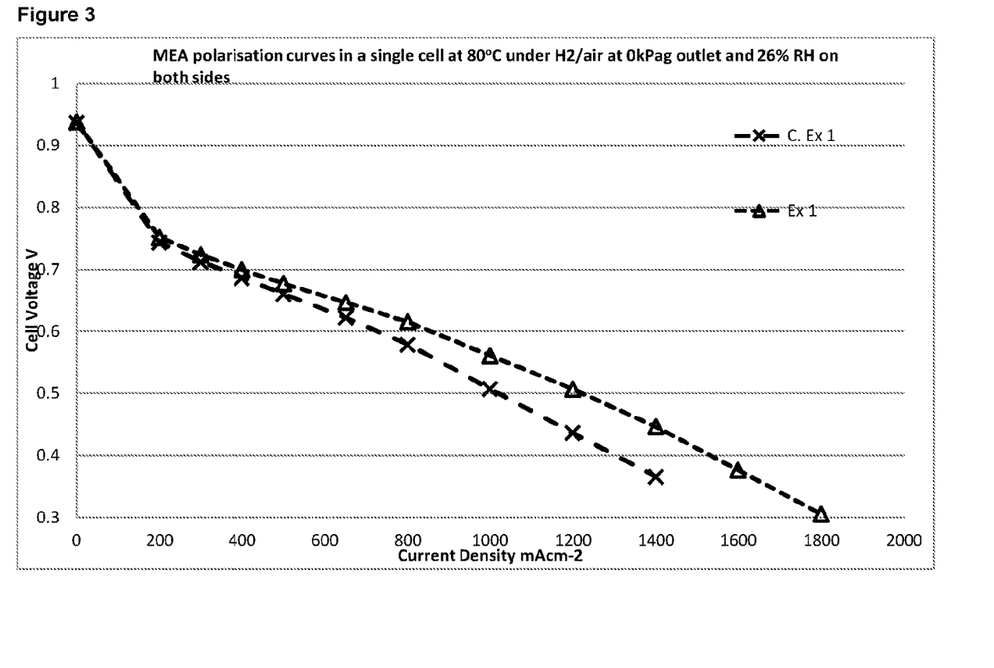
FIG. 3 is a plot of voltage versus current density at 26% relative humidity for a membrane electrode assembly comprising a cathode electrocatalyst layer prepared using the method of the invention, and a comparative membrane electrode assembly.

As can be seen in FIGS. 1, 2 and 3 the electrocatalyst ink prepared by the process of the present invention E1 shows better performance at high current densities than the electrocatalyst ink C1 prepared by a process which does not include a step of contacting the electrocatalyst ink with a base metal-binding agent.

A non-exhaustive list of aspects of the invention is provided in the following numbered clauses:

1. A method of preparing an electrocatalyst ink, the method comprising the steps of:
    i) preparing a dispersion comprising an electrocatalyst material, an ion-conducting material and a diluent; then
    ii) contacting the dispersion with a base metal-binding agent.
2. A method according to clause 1, wherein the electrocatalyst material comprises an electrocatalyst which is a platinum group metal or an alloy of a platinum group metal with a base metal.
3. A method according to clause 1 or clause 2, wherein the electrocatalyst is supported on a support material.
4. A method according to any preceding clause, wherein step i) includes a step of breaking up agglomerates in the dispersion.
5. A method according to clause 4, wherein the step of breaking up agglomerates in the dispersion is carried out by ball milling.
6. A method according to any preceding clause, wherein step ii) comprises dispersing the base metal-binding agent in the dispersion prepared in step ii), and the method further comprises a step iii) of filtering the dispersion to remove the base metal-binding agent.
7. A method according to clause 6, wherein the dispersion is agitated in step ii).
8. A method according to any of clauses 1 to 5, wherein step ii) comprises passing the dispersion through a column packed with the base metal-binding agent.
9. A method according to any of clauses 1 to 5, wherein step ii) comprises placing a vessel containing the base metal-binding agent in the dispersion, wherein the vessel is permeable to the dispersion, but is not permeable to the base metal-binding agent.
10. A method according to any preceding clause wherein the base metal-binding agent is a base metal-chelating agent.
11. A method according to clause 10, wherein the base metal-chelating agent comprises a base metal-chelating nitrogen containing moiety.
12. A method according to any of clauses 1 to 9, wherein the base metal-binding agent is an acidic cation-exchange resin.
13. A method of applying an electrocatalyst layer to a substrate, the method comprising the steps of:
    i) preparing an electrocatalyst ink by the method of any of clauses 1 to 12; then
    ii) applying the electrocatalyst ink onto the substrate and drying the ink to form an electrocatalyst layer.
14. An electrocatalyst layer obtainable by the method of clause 13.
15. A method of preparing a gas diffusion electrode, the method comprising applying an electrocatalyst layer to a substrate according to the method of clause 13, wherein the substrate is a face of a gas diffusion layer.
16. A gas diffusion electrode obtainable by the method of clause 15.
17. A method of preparing a catalysed decal transfer substrate, the method comprising applying an electrocatalyst layer to a substrate according to the method of clause 13, wherein the substrate is a face of a decal transfer substrate.
18. A catalysed decal transfer substrate obtainable by the method of clause 17.

19. A method of preparing a catalyst coated ion-conducting membrane, the method comprising applying an electrocatalyst layer to a substrate according to the method of clause 13, wherein the substrate is a face of an ion-conducting membrane.

20. A method of preparing a catalyst coated ion-conducting membrane, the method comprising applying an electrocatalyst layer to an ion-conducting membrane by decal transfer from a catalysed decal transfer substrate prepared according to the method of clause 17.

21. A catalyst coated ion-conducting membrane obtainable by the method of clause 19 or clause 20.

22. A method of preparing a membrane electrode assembly, the method comprising the steps of;
i) preparing a gas diffusion electrode according to the method of clause 15;
ii) applying the gas diffusion electrode prepared in step i) to a face of an ion-conducting membrane.

23. A method of preparing a membrane electrode assembly, the method comprising the steps of;
i) preparing a catalyst coated ion-conducting membrane according to the method of clause 19 or clause 20;
ii) applying a gas diffusion layer to the electrocatalyst layer.

24. A membrane electrode assembly obtainable by the method of clause 22 or clause 23.

25. A fuel cell comprising a membrane electrode assembly according to clause 24.

The invention claimed is:

1. A method of preparing an electrocatalyst ink, the method comprising the steps of:
   i) preparing a dispersion comprising an electrocatalyst material, an ion-conducting material and a diluent; then
   ii) contacting the dispersion with a base metal-binding agent.

2. The method according to claim 1, wherein the ion-conducting material is a proton conducting ionomer.

3. The method according to claim 1, wherein the electrocatalyst material comprises an electrocatalyst which is a platinum group metal or an alloy of a platinum group metal with a base metal.

4. The method according to claim 1, wherein the electrocatalyst is supported on a support material.

5. The method according to claim 1, wherein step i) includes a step of breaking up agglomerates in the dispersion.

6. The method according to claim 5, wherein the step of breaking up agglomerates in the dispersion is carried out by ball milling.

7. The method according to claim 1, wherein step ii) comprises dispersing the base metal-binding agent in the dispersion prepared in step ii), and the method further comprises a step iii) of filtering the dispersion to remove the base metal-binding agent.

8. The method according to claim 7, wherein the dispersion is agitated in step ii).

9. The method according to claim 1, wherein step ii) comprises passing the dispersion through a column packed with the base metal-binding agent.

10. The method according to claim 1, wherein step ii) comprises placing a vessel containing the base metal-binding agent in the dispersion, wherein the vessel is permeable to the dispersion, but is not permeable to the base metal-binding agent.

11. The method according to claim 1, wherein the base metal-binding agent is a base metal-chelating agent.

12. The method according to claim 11, wherein the base metal-chelating agent comprises a base metal-chelating nitrogen containing moiety.

13. The method according to claim 1, wherein the base metal-binding agent is an acidic cation-exchange resin.

14. A method of applying an electrocatalyst layer to a substrate, the method comprising the steps of:
   i) preparing an electrocatalyst ink by the method of claim 1; then
   ii) applying the electrocatalyst ink onto the substrate and drying the ink to form an electrocatalyst layer.

15. A method of preparing a gas diffusion electrode, the method comprising applying an electrocatalyst layer to a substrate according to the method of claim 14, wherein the substrate is a face of a gas diffusion layer.

16. A method of preparing a membrane electrode assembly, the method comprising the steps of:
   i) preparing a gas diffusion electrode according to the method of claim 15;
   ii) applying the gas diffusion electrode prepared in step i) to a face of an ion-conducting membrane.

17. A method of preparing a catalysed decal transfer substrate, the method comprising applying an electrocatalyst layer to a substrate according to the method of claim 14, wherein the substrate is a face of a decal transfer substrate.

18. A method of preparing a catalyst coated ion-conducting membrane, the method comprising applying an electrocatalyst layer to an ion-conducting membrane by decal transfer from a catalysed decal transfer substrate prepared according to the method of claim 17.

19. A method of preparing a catalyst coated ion-conducting membrane, the method comprising applying an electrocatalyst layer to a substrate according to the method of claim 14, wherein the substrate is a face of an ion-conducting membrane.

20. A method of preparing a membrane electrode assembly, the method comprising the steps of:
   i) preparing a catalyst coated ion-conducting membrane according to the method of claim 19;
   ii) applying a gas diffusion layer to the electrocatalyst layer.

* * * * *